Jan. 8, 1929.  
W. H. PRATT  
1,698,276  
VOLT AMPERE INDICATING INSTRUMENT  
Filed Feb. 21, 1924  
2 Sheets-Sheet 1

Inventor:
William H. Pratt,
by Alexander S. Lend
His Attorney.

Patented Jan. 8, 1929.

1,698,276

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

VOLT-AMPERE-INDICATING INSTRUMENT.

Application filed February 21, 1924. Serial No. 694,445.

My invention relates to electrical measuring instruments and more particularly to instruments for indicating and recording the instantaneous volt amperes of an alternating current circuit.

In some instances it is desirable to obtain the product of volts and amperes expended at the load or supplied by a generator, which value is, of course, independent of the power factor. In my Patent 1,530,322, entitled Electrical measuring instrument and assigned to the same assignee as the present invention, I have described an instrument for integrating volt ampere hours.

The principal feature of the invention described in said application consists in adjusting a plurality of integrating type wattmeter elements in such a way that each will rotate at its maximum possible speed for a certain definite value of the power factor of the circuit metered, and arranging these instruments so that a properly constructed indicator is moved in accordance with the fastest moving element, the various measuring elements being constructed and adjusted so that the power factors at which they will rotate at their maximum speeds vary from element to element, and so that the maximum speed is the same for each instrument for the same value of power factor. By such an arrangement it is possible to integrate the volt amperes with a fair degree of accuracy.

The invention of the present application embodies the same general principle, but relates to indicating type instruments instead of integrating type instruments and the registering device is arranged to indicate and record the instantaneous volt amperes of the circuit being metered. Certain parts of the registering device may also be used to indicate the approximate power factor of the circuit.

Figure 1:
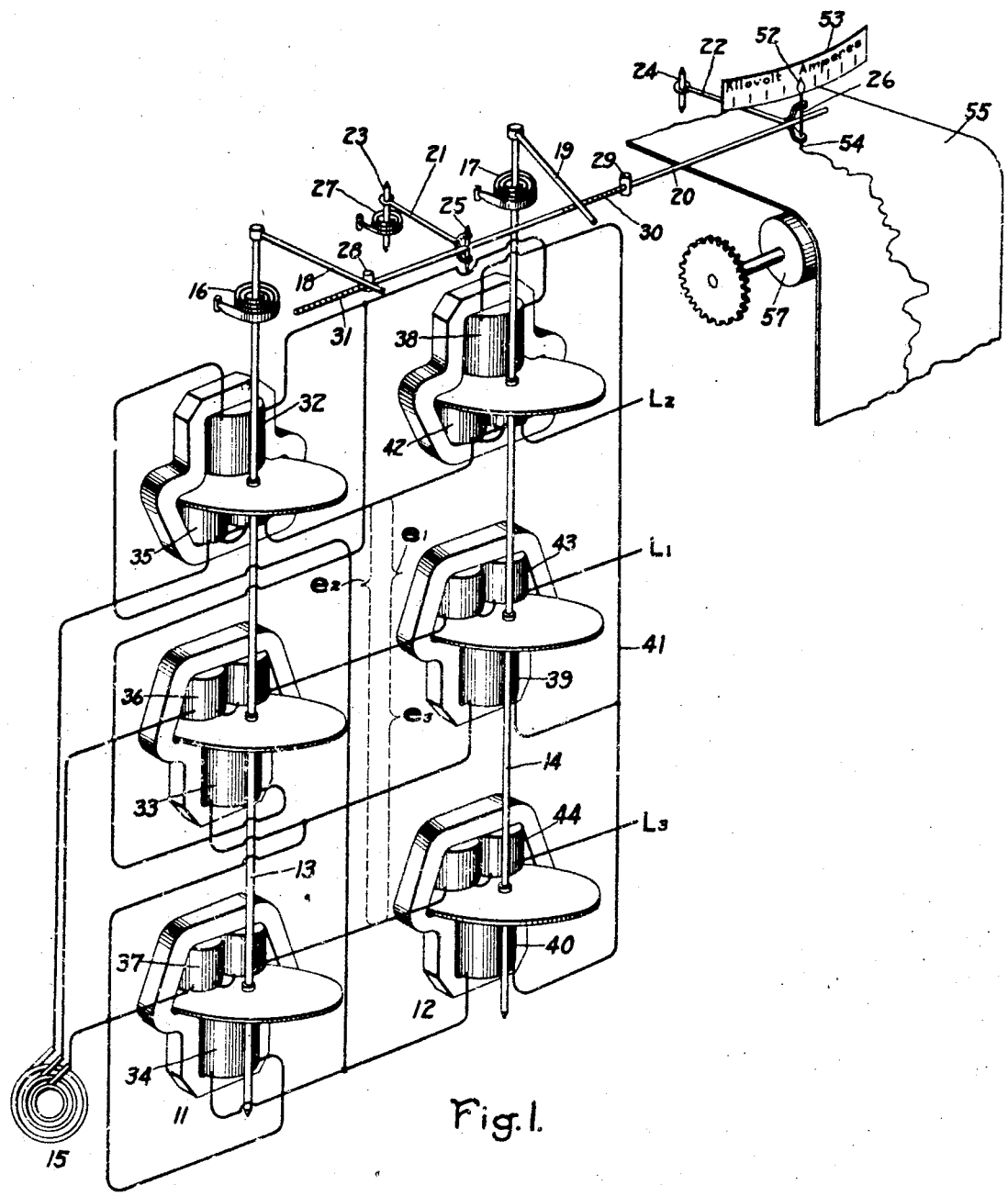
Figure 2:
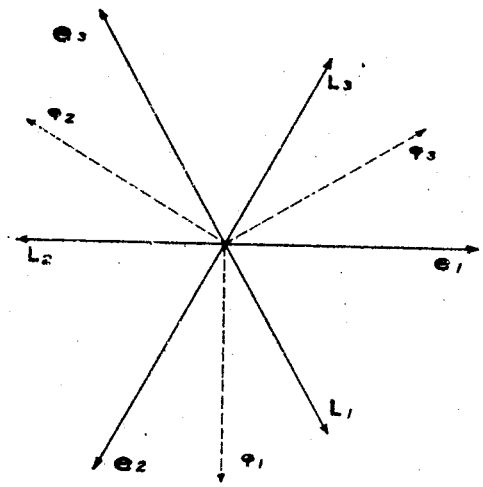
Figure 3:
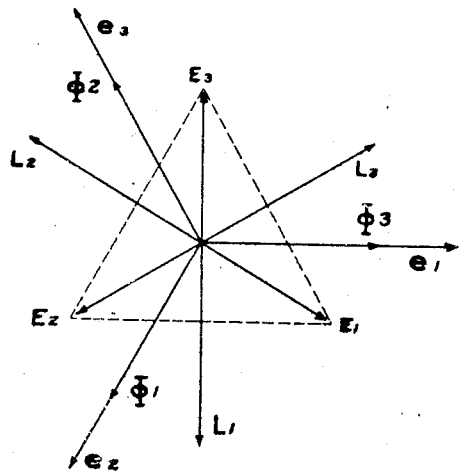
Figure 4:
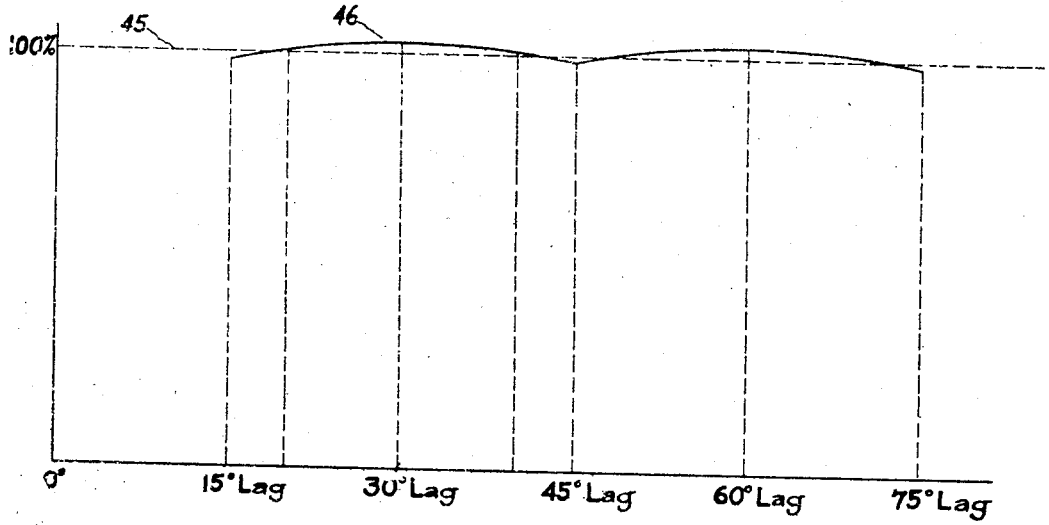

The features of my invention which I believe to be novel and patentable will be pointed out in the claims appended hereto. For a better understanding of my invention reference is made, in the following description, to the accompanying drawings in which Fig. 1 represents a perspective view of the essential parts of the apparatus embodied in a preferred modification of the present invention. Fig. 2 is a diagram showing the vector relations of the E. M. F.'s and fluxes of one of the polyphase measuring elements of Fig. 1; Fig. 3 is a similar diagram showing vector relations of the other polyphase measuring element of Fig. 1 and Fig. 4 is a calibration curve showing how the indication obtained deviates from accuracy as the power factor changes.

Referring now to Fig. 1, my invention is here shown embodying only two three-phase instruments 11 and 12 of the indicating type, having shafts 13 and 14. In this embodiment I have shown induction type meter elements but it is to be understood that other forms of meter elements may be used is desired. The instruments are arranged to measure, indicate and record the instantaneous kilo volt amperes of the circuit supplied by the alternator 15. Each measuring element comprises three single-phase induction type wattmeter elements connected in corresponding phases of the three-phase circuit. The measuring element 11 is so connected in the present instance that it gives its maximum torque for a given volt ampere load when the load is lagging and the power factor of the system is equal to the cosine of 30° or .866. The element 12 is so connected that it gives its maximum torque for a given volt ampere load when the power factor is equal to the cosine of 60° or .500 and is lagging. The torques of the two meter elements are resisted by suitable coiled springs 16 and 17 so that their pointers 18 and 19 secured to the upper ends of the shafts 13 and 14 are respectively deflected to the right to an extent proportional to the volt ampere load referred to .866 and .500 power factors respectively. That is the deflection of pointer 18 is proportional to the 30° out of phase component of volts and amperes and the deflection of pointer 19 is proportional to 60° out of phase component of volts and amperes in the same manner that a watt meter indication is proportional to the in phase component of volts and amperes.

The pointers 18 and 19 both cooperate with a common indicator or recorder arm 20 which is supported by arms 21 and 22 pivoted at 23 and 24 respectively. The arm 20 is connected to the arms 21 and 22 by pivots 25 and 26 so that the member 20 forms a link between the outer ends of arms 21 and 22. This linked element is biased towards the left by a light coiled spring 27 about the pivoted shaft of arm 21. The arm 20 is provided with adjustable abutments 28 and 29, which abutments are adapted to be engaged by the outer end portions of pointers 18 and 19 respectively in such a manner that the movement of the common indicating arm 20 towards the right is at all times proportional to the maximum deflection of either pointer. The strength of spring 27 is just sufficient to keep the member 20 to the left with one or the other of the abutments 28 or 29 against its corresponding pointer.

Thus, in the position illustrated, the pointer 18 has the greatest deflection so that the position of member 20 is determined by that pointer, while the pointer 19 stands some distance away from its abutment. This condition of affairs indicate that the power factor is nearer .866 lagging than .5 lagging and the distance pointer 19 is from its abutment 29 is a rough indication of this difference.

It will thus be evident that the relative positions of the pointers 18 and 19 with respect to their abutments gives an approximate indication of the power factor. For example, if both pointers were against their abutment it will be shown that the power factor is approximately that corresponding to the cosine of 45° or .70 and this particular approximate indication will be true for all volt ampere loads at .70 power factor. The power indications above .70 power factor, which will be given by the distance of pointer 19 from abutment 29, and the corresponding indication below .70 power factor, which will be given by the distance of pointer 18 from abutment 28, will vary somewhat with the volt ampere load; but if graduations are placed upon the arm 20 as indicated at 30 and 31 indicating the true power factor values for the average volt ampere load, these indications will be useful as an approximate indication of power factor at the average load and at other loads close to the average load. For other volt ampere loads a correction table or curve may be prepared so that by referring to the volt ampere indication which is given at 52 and this correction table or curve a correction factor may be found which if multiplied by the power factor indication will give the true power factor at this particular volt ampere load.

This feature, while advantageous and desirable, is only incidental to the real purpose of the apparatus which is to indicate and record the instantaneous volt ampere load. At the right extremity of arm 20 is an indicating pointer 52 cooperating with a stationary scale 53, which is preferably slightly curved to correspond to the circular movement of the indicator incident to its being pivoted at 24, and a recording stylus 54 cooperating with a recording chart 55. The chart will be suitably supported on a drum 57 and moved along by any of the well known arrangements used for that purpose. The scale and the chart are properly calibrated with the instrument to indicate and record volt amperes.

As hereinbefore stated meter element 11 is so adjusted that it gives a maximum torque when the load lags at an angle of 30°. To understand how this may be accomplished, attention is called to Fig. 2, which shows the vector relations of the currents flowing in the various lines and the E. M. F.'s impressed on the coils and the functions obtained therein. The vectors $e_1$ $e_2$ and $e_3$ are the E. M. F.'s obtained respectively between lines $L_1$ and $L_2$; lines $L_2$ and $L_3$; and lines $L_3$ and $L_1$. It may be readily ascertained that when the load has a power factor of cosine 30° and is lagging, then the current in line $L_1$ is lagging by 60° behind the E. M. F. $e_1$. This is shown in Fig. 2. The corresponding currents in the other two lines $L_2$ and $L_3$ are shown by the vectors appropriately labeled in this figure. The potential coil 32 is, as is evident from Fig. 1, connected between lines $L_2$ and $L_1$ and has impressed on it an E. M. F. equal to $e_1$. Since the circuit of this coil is highly inductive, the flux lags by 90° behind $e_1$ as is shown by the dotted arrow labeled $\phi_1$. In the same way the potential coil 33 is connected between lines $L_1$ and $L_3$ and has therefore an E. M. F. impressed upon it represented by the vector $e_3$, and produces a flux $\phi_3$. The potential coil 34 similarly has an E. M. F. of $e_2$ impressed upon it and produces a flux $\phi_2$. The current coil 35 produces a flux in phase with the current flowing through it of $L_2$. The flux produced by this coil coacts with the flux $\phi_1$ of the potential coil 32. It is seen that the angle between vector $\phi_1$ and $L_2$ is 90°, and therefore a maximum torque is produced. In the same way the current represented by vector $L_1$ coacts with the flux $\phi_3$, while the flux produced by the current coil 37 represented by the vector $L_3$ coacts with the flux $\phi_2$. In all three cases the current and the coacting potential fluxes are displaced by 90°. It is evident therefore, that at 30° lag the element 11 will have its maximum torque.

The element 12 as stated heretofore is so arranged that it will have a maximum torque when the power factor of the circuit is equal to the cosine of 60°. This result is obtained by connecting the potential coils 38, 39 and 40 in Y instead of in delta as the potential coils in the element 11. The common wire connection is represented by the wire 41. The vector relations may best be understood by reference to Fig. 3. In this figure the vectors $e_1$, $e_2$ and $e_3$ still represent the E. M. F.'s between the lines as in the previous case. However, since now we are assuming that the current is lagging by 60° in the load of the three phase system, it may readily be ascertained that the current vectors will be displaced as shown, that is, the current in line $L_1$ will be 90° displaced from the E. M. F. vector $e_1$, while the other vectors $L_2$ and $L_3$ take corresponding positions with respect to the other electromotive force vectors.

Since the coils 38, 39 and 40 are connected in Y, the E. M. F. impressed upon coil 38 may be represented by the vector $E_1$, that impressed upon coil 39 by vector $E_3$ and that impressed upon coil 40 by the vector $E_2$. Thus the vector difference of $E_2$ and $E_1$ give a vector equal to vector $e_1$ and similarly for the other E. M. F. vectors $e_2$ and $e_3$. The flux produced by the potential coil 38 is represented by $\phi_1$, the flux produced by the potential coil 39 is represented by the vector $\phi_3$ and the flux produced by the coil 40 is represented by the vector $\phi_2$. The fluxes produced by the current coils 42, 43 and 44 are in phase with the current vectors $L_1$, $L_2$ and $L_3$. The flux produced by current $L_1$ coacts with the flux $\phi_3$, the flux produced by current $L_2$ coacts with the flux $\phi_1$, while the flux produced by current $L_3$ coacts with flux $\phi_2$. In this case also it is seen that the angles between these coacting vectors are exactly 90° and therefore the element 12 gives its maximum torque when the load is lagging by 60°.

It is evident that the common registering arm 20 will have its maximum movement to the right for a given volt ampere load when the load is lagging by exactly 30° or by exactly 60°, such movements being due to pointers 18 and 19 respectively. At 45° lag, both pointers 18 and 19 will come against their respective abutments 28 and 29 on the arm 30 and the indications will be due to the joint torques of both meter elements. At power factors corresponding to a lag less than 45° the movement of member 20 will be due to pointer 18 alone and at power factor corresponding to a lag greater than 45°, the movement of member 20 will be due to pointer 19 alone. Attention is called to Fig. 4, which shows the calibration curve of the instrument upon a variation in power factor. At 15° lag, the element 11 will have a greater torque than element 12 since 15° is nearer 30° than it is to 60° and the ratio of its torque at 15° lag to its torque at 30° lag is .9659 or the cosine of $(30-15)°$. The instrument may be so adjusted as to give a correct registration at the scale 53 when the torque is .9829 times its maximum torque which value is the average between the torques at 15° lag and 30° lag. This value corresponds to a power factor equal to the cosine of $(30° \pm 10°\ 36')$. These values are obtained by noting that an angle of 10° and 36' has a cosine equal to .9829 and that there must therefore be this deviation from a 30° lag (corresponding to maximum torque) to make the torque of meter 11 equal to .9829 of the maximum. Thus for power factors corresponding to 19° and 24' lag or 40° and 36' lag, the instrument indicates accurately. In Fig. 4 the dotted line 45 represents the 100% accuracy line. The abscissa represents degrees lag and the ordinates represent instrument accuracy. The full line curve 46 between 15° lag and 45° lag represents the accuracy curve for meter element 11 and the full line curve from 45° lag to 75° lag represents the accuracy curve for meter element 12. It has been assumed that the particular volt ampere meter instrument described is to be used for metering a circuit where the angle of lag varies between 15° and 75°, and within these values the calibration curve of the combined instrument is represented by the full line 46. It will be noted that the instrument is accurate at four points as shown by the curve of Fig. 4 and at other points the accuracy of the instrument is within commercial limits.

While I have shown and described only two meters for actuating a common indicator and recorder, it will be evident that if the power factor of the circuit to be metered varies over a much wider range than that assumed in the foregoing discussion, additional meters adjusted to give their maximum torques at different power factors and all operating on a common register, as the power factor varies, may be employed. It will also be evident that the invention is not limited to polyphase meters or to any particular power factor adjustments, or to the hereinbefore described manner of adjusting the meters to register at different power factors. I do not wish therefore to be limited to the particular modification illustrated but aim to embrace in the appended claims all modifications falling fairly within the scope of my invention.

What I claim as new and desire to secure by Letters Patent of the United States, is:—

1. In an electrical measuring instrument for alternating current circuits, a plurality of indicating deflection type measuring elements adjusted for maximum torques at different power factors, a common indicator therefor and means connected between said common indicator and meter elements for deflecting the indicator in a given path in accordance with the maximum deflection of the elements.

2. In an electrical measuring instrument for alternating current circuits, means for measuring a quantity proportional to the volt amperes expended in any circuit comprising a plurality of indicating deflection type measuring elements, each adapted to be connected to the circuit, each adjusted to produce a maximum measuring effect at different power factors, and indicating means arranged to be deflected in accordance with the maximum of the measuring element movements.

3. In a polyphase circuit, means for measuring the instantaneous volt amperes flowing in said circuit, comprising a plurality of indicating deflection type induction meter elements having current and potential coils, one of said elements having its potential coils in delta, and the series coils connected in series relation with the line, while the other element has coils so connected that the vector relations for a certain power factor for the fluxes produced by cooperating current and potential coils differ from those in the first element, and a common indicator arranged to be deflected in accordance with the maximum deflection of said elements.

4. A recording volt ampere meter comprising a plurality of indicating type watt meter elements adjusted for maximum torques at different power factors, a chart, a recording stylus cooperating with said chart to make a record thereon, and means connected between said meter elements and said stylus for moving said stylus with respect to said chart in accordance with the maximum deflection of said meter elements.

5. In combination a plurality of indicating type meter elements having movable arms arranged to be deflected in the same general direction in accordance with the measurements of said meters, a common indicating member cooperating with said arms and arranged to be moved from a zero indication position in accordance with the maximum deflection of said arms, means for returning said common indicating member towards a zero position when the said maximum deflection is decreased and means for recording the movements of said common indicating member.

6. In combination a pair of alternating current indicating type, watt-meter elements, adjusted to measure volt amperes at different power factors, movable members individually deflected by said elements according to their respective measurements, and a common indicator cooperating with said members and arranged to be moved in accordance with the maximum deflection of said members and means for continuously recording the position of said indicator.

7. In combination a pair of alternating current indicating type, watt-meter elements adjusted to measure volt amperes at different power factors, a common indicator for said meter elements arranged to indicate the maximum deflection of either of said elements in terms of volt amperes and means for indicating the difference in the deflections of said meter elements in terms of power factor.

8. In combination a pair of indicating type meter elements, parallel shafts for the movable members of said elements, arms extending from said shafts positioned and adjusted to be deflected in a common plane and having substantially parallel positions for corresponding meter deflections, a common indicating bar mounted for longitudinal movement and positioned adjacent the outer extremities of said arms and cross ways thereto, a light spring for moving said bar towards the zero deflection position of said arms, lost motion connections between said arms and said bar such that the bar is caused to be moved away from a zero position in accordance with the maximum deflection of either of said arms and means for continuously recording the position of said bar.

In witness whereof, I have set my hand this 15th day of February, 1924.

WILLIAM H. PRATT.